Feb. 27, 1923.
C. E. SCHULZ
RADIATOR REPAIR MACHINE
Filed Aug. 11, 1919      4 sheets-sheet 1
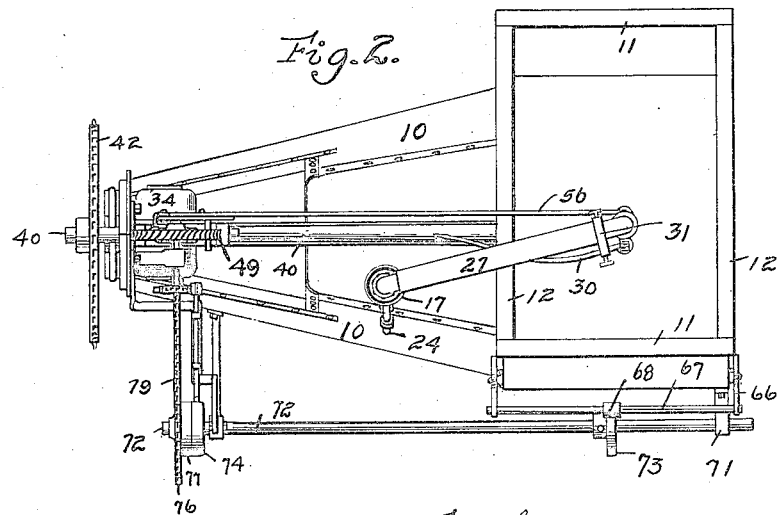
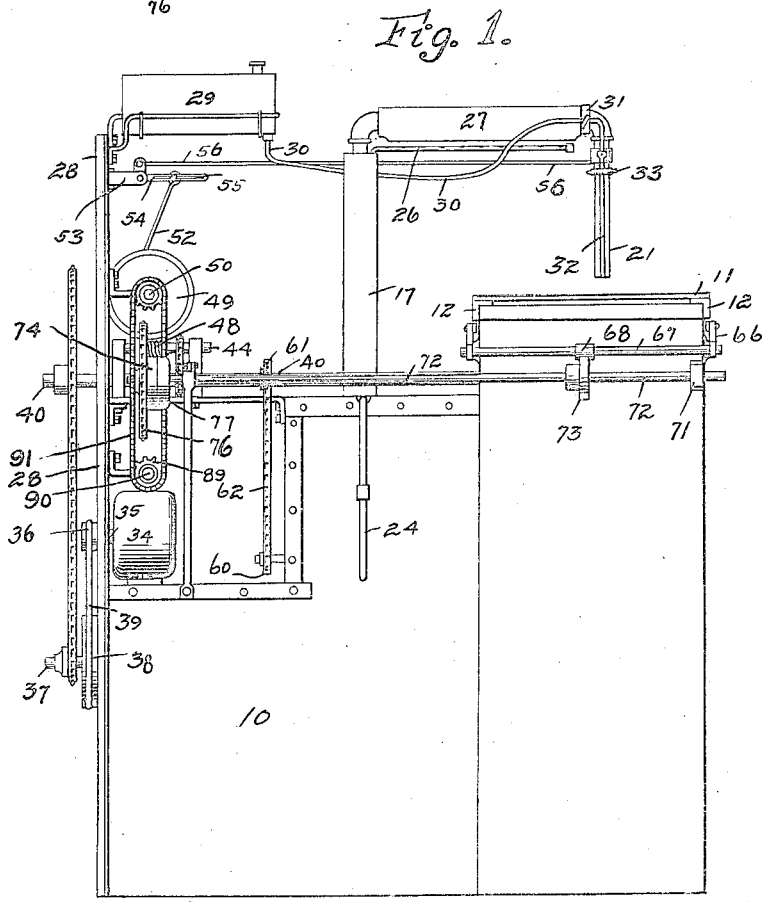
Witness
Lynn Latta
Inventor
C. E. Shulz
By Orwig & Bole Attys Feb. 27, 1923.
C. E. SCHULZ
RADIATOR REPAIR MACHINE
Filed Aug. 11, 1919
1,446,667
4 sheets-sheet 2
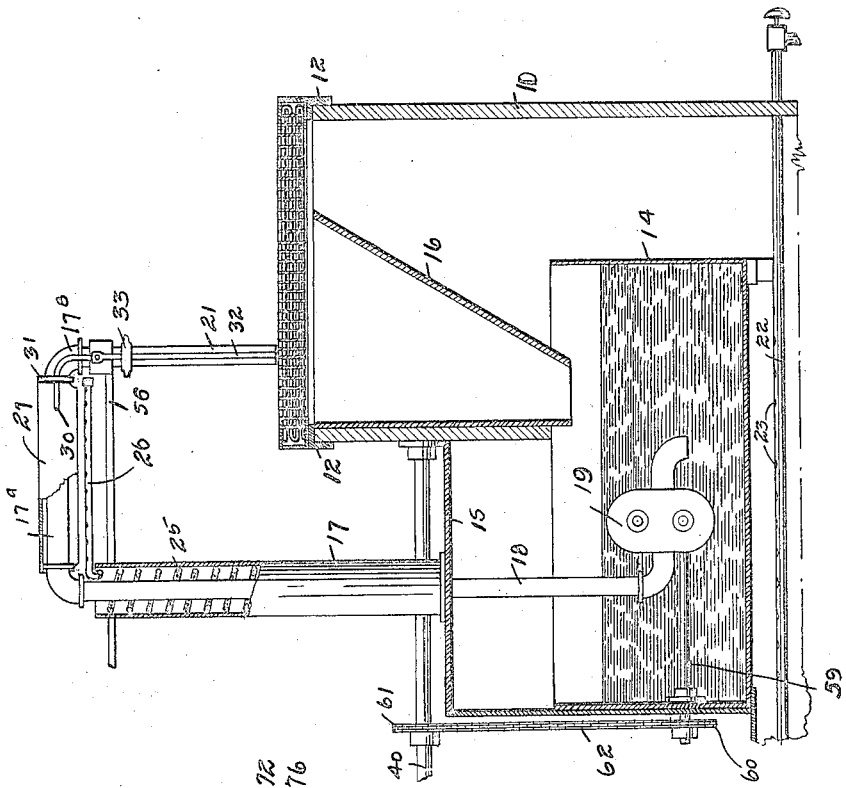
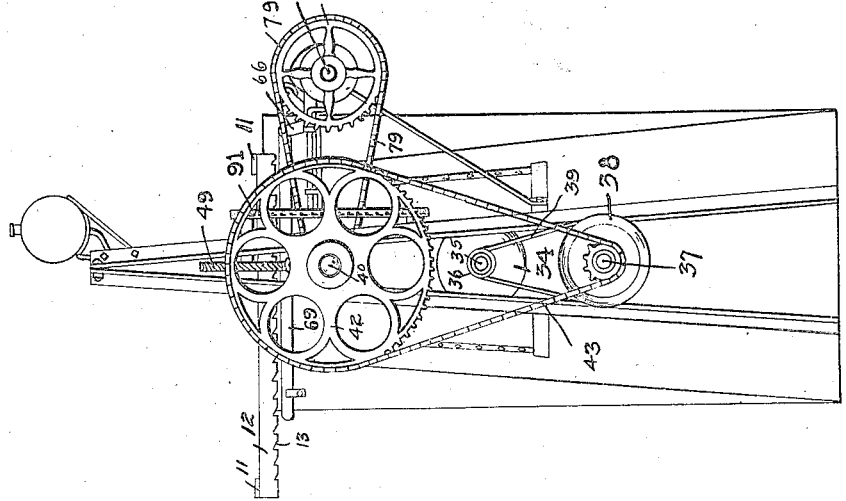
Inventor
C. E. Schulz
BY Orwig & Bair Attys.

Feb. 27, 1923.
C. E. SCHULZ
RADIATOR REPAIR MACHINE
Filed Aug. 11, 1919
1,446,667
4 sheets-sheet 3
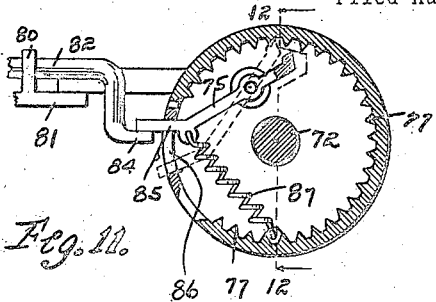
Fig. 11.
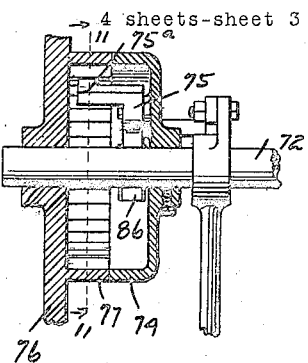
Fig. 12.
Fig. 7.
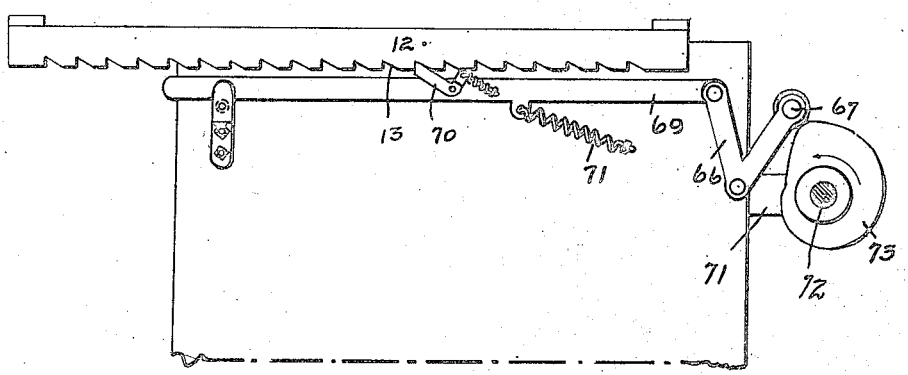
Fig. 5.
Fig. 6.
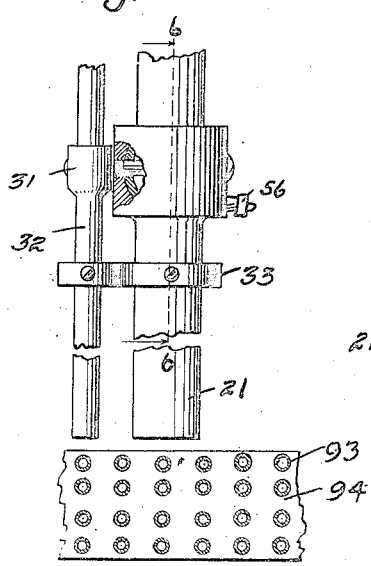
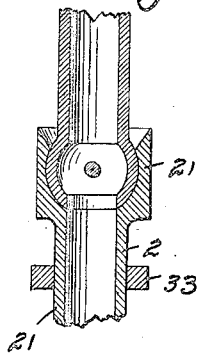
Witness
Lynn Latta
Inventor
C. E. Shulz
By Craig r Bair Attys Feb. 27, 1923.
C. E. SCHULZ
RADIATOR REPAIR MACHINE
Filed Aug. 11, 1919
1,446,667
4 sheets-sheet 4
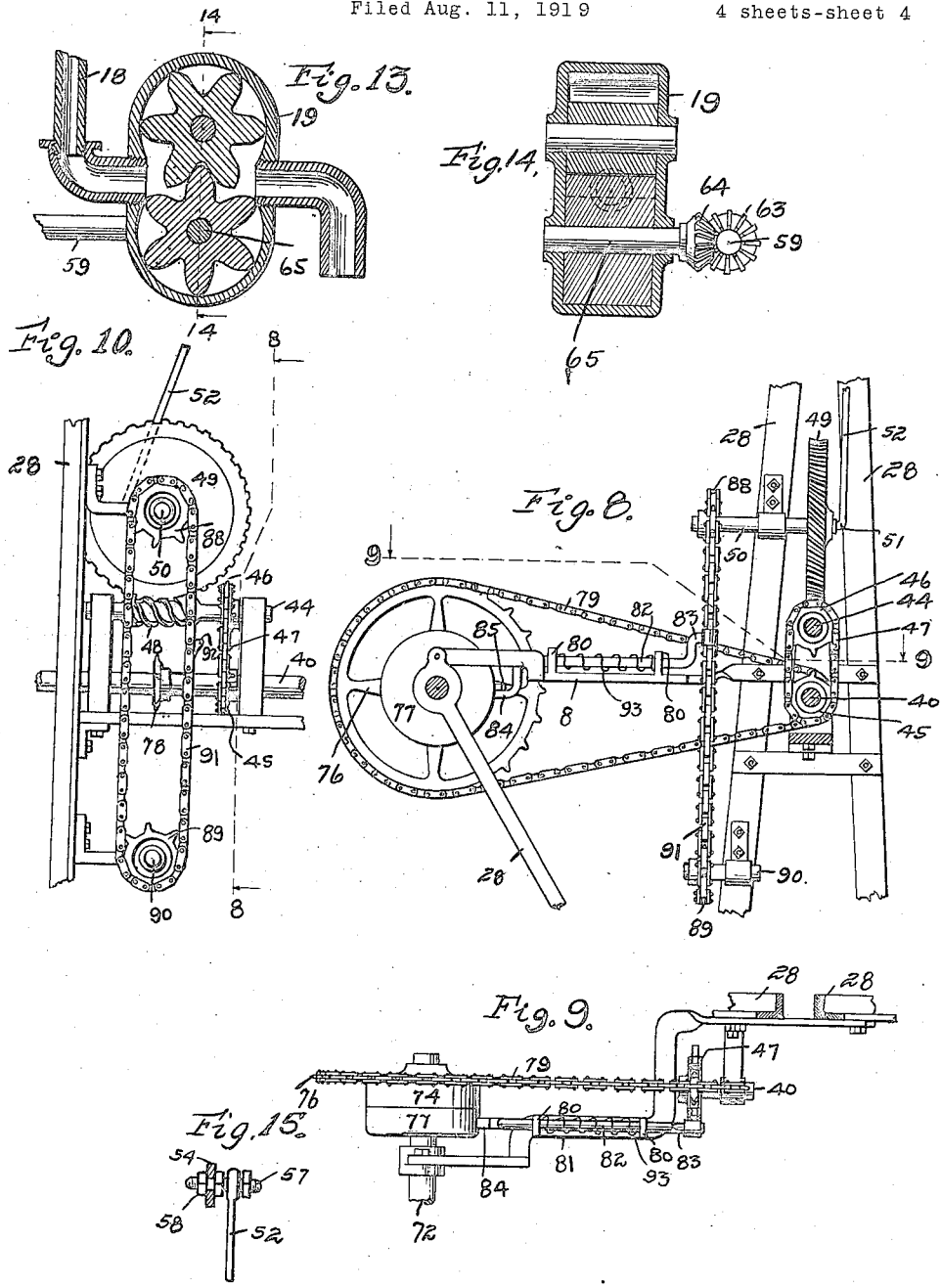

Patented Feb. 27, 1923.

1,446,667

UNITED STATES PATENT OFFICE.

CLYDE E. SCHULZ, OF FORT DODGE, IOWA, ASSIGNOR TO AUTOMOTIVE RADIATOR MACHINE COMPANY, OF FORT DODGE, IOWA, A CORPORATION.

RADIATOR-REPAIR MACHINE.

Application filed August 11, 1919. Serial No. 316,891.

*To all whom it may concern:*

Be it known that I, CLYDE E. SCHULZ, a citizen of the United States, and a resident of Fort Dodge, in the county of Webster and State of Iowa, have invented a certain new and useful Radiator-Repair Machine, of which the following is a specification.

My invention relates to machines for repairing radiators of water cooled engines. It is well-known that radiators are ordinarily built with a plurality of small vertical tubes mounted in a series of horizontal partitions. When these tubes rust or split they are very hard to repair. In repairing said tubes they are cleaned by pouring acid over them and are then repaired by pouring moulten solder over the holes in their walls.

The object of my invention is to provide a machine of simple, durable and effective construction, whereby a stream of moulten metal may be directed along a row of these tubes, said machine having means for intermittently moving the radiator for successively bringing the rows of tubes under the solder discharge tube.

A further object is to provide such a machine having an acid discharge tube arranged to travel substantially according to the travel of the solder discharge tube, and ahead of said tube for cleaning the radiator tubes in advance of the subjection to the radiator tubes of the solder.

Still a further object is to provide simple means for regulating the stroke of the solder discharge tube.

A further object is to provide suitable means for maintaining the solder in its moulten state until its discharge.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a radiator repair machine embodying my invention.

Figure 2 shows a top or plan view of the same.

Figure 3 shows a rear elevation of the machine.

Figure 4 shows a vertical, sectional view through part of the machine.

Figure 5 shows a detail view of the acid solder discharge tubes illustrating the joints therein.

Figure 6 shows a detail, sectional view taken on the line 6—6 of Figure 5.

Figure 7 shows a detail view of the radiator supporting platform, and part of the means for intermittently advancing the same.

Figure 8 shows a detail, sectional view of part of the mechanism taken on the line 8—8 of Figure 10.

Figure 9 shows a detail, sectional view taken on the line 9—9 of Figure 8.

Figure 10 shows a detail view of part of the mechanism.

Figure 11 shows a vertical, sectional view of the intermittent clutch device taken on the line 11—11 of Figure 12.

Figure 12 shows a transverse, vertical, sectional view of said clutch mechanism taken on the line 12—12 of Figure 11.

Figure 13 shows a detail, sectional view of the pump.

Figure 14 shows a detail, sectional view of the pump taken on the line 14—14 of Figure 13.

Figure 15 shows a detail, sectional view of the adjustable means for regulating the stroke of the discharge tubes.

In the accompanying drawings I have used the reference numeral 10 to indicate generally a supporting frame at the top of which is mounted a slidable frame 11, adapted to support a radiator in position for lateral sliding movement on the main frame.

The frame 11 has at its forward and rear sides angle iron slide members 12, each having a flange extending downwardly outside the wall of the frame 10, and formed with notches 13. Said radiator supporting frame being shown in Figures 1, 2, 3, 4, and 7.

Adjacent to the frame 10 is a solder tank 14, from one end of which projects a portion of the frame 10, as illustrated in Figure 4.

The frame 10 is preferably enclosed. The solder tank 14 is provided with a cover 15. A solder conducting chute 16 is provided for carrying moulten solder that has passed through the radiator and through the frame 11 downwardly to the solder tank.

Extending upwardly from the top of the solder tank cover 15 is a cylindrical sleeve 17. Extending upwardly from a point near the bottom of the solder tank, is a solder conducting tube 18, connected with which is a rotary pump 19. The tube 18 extends upwardly through the cover 15 and through the sleeve 17. The tube 18 has at its upper end a portion 17$^a$ extending forwardly in the machine, as shown in Figure 4, and provided at its forward end with a downward extension 17$^b$. Connected with the extension 17$^b$ by means of a ball and socket joint 20 is a swinging solder discharge tube 21.

A suitable burner device 22 is arranged beneath the tank 14 for heating the solder therein.

The burner device, in the illustration shown, consists of a gas conducting tube having holes 23 therein.

Communicating with the burner tube 22 is a gas conducting tube 24 which extends upwardly and connects with a burner coil 25 in the sleeve 17 surrounding the portion of the tube 18 within said sleeve. The upper end of the coil 25 connects with a burner tube 26 beneath the portion 17$^a$ of the tube 18.

Mounted on the portion 17$^a$ is a heating drum 27 open at its lower portion.

Mounted on a suitable upright 28 is an acid tank 29. Leading from the acid tank 29 is a tube 30, which is detachably supported on a bracket 31 near the forward end of the extension 17$^a$. At the forward end of the acid conducting tube 30, said tube is connected by means of a joint 31 similar in general construction to the joint 21 with a swinging acid discharge tube 32. The tubes 21 and 32 are connected by a clamp or bracket 33 to cause them to swing in unison.

Mounted on the rearward portion of the frame 10 is a prime mover, such as the electric motor 34 having a shaft 35 on which is a small belt pulley 36.

Suitably mounted on the frame is a shaft 37 on which is a larger belt pulley 38, aligned with the pulley 36. A belt 39 connects the pulleys 36 and 38.

Mounted on the rear portion of the frame in suitable bearings is a drive shaft 40. On the shafts 37 and 40 are sprockets 41 and 42 aligned with each other. A chain 43 transmits motion from the shaft 37 to the shaft 40. Above the shaft 40 is a short shaft 44. The shafts 40 and 44 are operatively connected by means of sprockets 45 and 46, and a chain 47. On the shaft 44 is a worm 48 which meshes with a worm wheel 49 on a shaft 50 suitably supported above the shaft 44 and transversely of the machine.

Pivotally connected off center to the worm wheel 49 by means of a wrist pin 51 is a pitman 52, extending upwardly as illustrated in Figures 1 and 8.

Pivoted at its angle on the bracket 53 is a bell crank lever 54 having one comparatively long arm formed with an elongated slot 55, and having a relative short arm pivoted to a link 56.

The upper end of the pitman 52 is pivoted on a short shaft 57, one end of which is extended through the slot 55 and is locked in any suitable position therein by means of a nut 58.

The link 56 extends forwardly in the machine and is attached at its forward end to the solder discharge tube 21 below the joint at the upper end thereof. It will be seen that I have provided a step down gearing for transmitting motion from the motor 34 to the worm wheel 49. The worm wheel 49 imparts reciprocating movement to the pitman 52 and the bell crank lever 54 for thereby imparting swinging movement to the solder discharge tube 21 and the acid discharge tube 32 for swinging the discharge ends of said tube forwardly and rearwardly in the machine for discharging solder and acid along the tubes of a radiator.

Extending through the wall of the frame or casing 10, and through the wall of the tank 14 is a shaft 59 on which is a sprocket 60 arranged in line with the sprocket 61 on the shaft 40.

The chain 62 travels on the sprockets 60 and 61. On the inner end of the shaft 59 is a bevelled gear 63 which meshes with a bevelled gear 64 on a shaft 65 of the rotary pump 19.

It will thus be seen that the pump 19 is operated from the motor through the shaft 35, the belt 39, and sprockets 36 and 38, the shaft 37, the sprockets 41 and 42, and chain 43, the shaft 40, the sprockets 60 and 61 and chain 62, the shaft 59 and bevelled gears 63 and 64.

It will be understood that when a radiator is to be cleaned and repaired it is laid on the frame 11 with its tubes arranged fore-and-aft in the machine.

When the machine is operated, the discharge tubes 32 and 21 will be swung fore-and-aft for discharging acid and solder upon the radiator.

For moving the radiator supporting frame 11 across the machine for bringing all the tubes successively, first beneath the acid discharge tube, and then beneath the solder discharge tube, and for giving proper intermittent motion to said frame, and the radiator supported thereon, I have provided the following means.

Pivoted between their ends on the upper portion of the frame at the left-hand side thereof, are V-shaped bell crank levers 66. A shaft 67 is rotatably mounted in one arm of each of said bell crank levers.

Mounted on the shaft 67 is a rotary sleeve 68. Pivoted to the other arm of each bell crank 66 is a slide bar 69 to which is pivoted a spring actuated pawl 70, adapted to engage in the notches 13. Springs 71 normally hold the slide bars 69 at the forward limit of their movement. Mounted in suitable bearings 71 preferably below the shaft 67 is a shaft 72 extending along side the machine, and having mounted thereon a cam 73 illustrated in Figures 1 and 7.

For intermittently imparting rotation to the shaft 72 for thereby intermittently advancing the platform 11, a distance equal to the distance between two successive notches 13 transversely across the machine, I have provided the following mechanism.

Fixed on the shaft 72 is a casing member 74 to which is pivoted a pawl 75 having a laterally extending arm 75ª.

Loosely mounted on the shaft 72 is a sprocket 76 having an internally toothed annular laterally extending flange 77.

On the shaft 40 is a sprocket 78 shown in Figure 10, which is aligned with the sprocket 76. A chain 79 travels on the sprockets 78 and 76.

Rotatably mounted in suitable bearings 80 on a bracket 81 is a shaft 82 having at one end a crank 83, and at the other end a crank 84.

The pawl 75 has an arm 85 (Figs. 8 and 11) which projects through an opening 86 in the casing 74 as illustrated in Figure 11.

The spring 87 normally holds the pawl 75 in position in engagement with the teeth on the inside of the flange 77.

On the shaft 50 is a sprocket 88 aligned with the sprocket 89 on a stub shaft 90. A chain 91 travels on the sprockets 88 and 89. On the chain 91 is a projecting lug 92, shown in Figure 10.

A spring 93 normally holds the shaft 82 in position with the crank arm 83 in the path of the lug 92, and also holds said shaft in such position that the crank arm 84 stands normally in the position shown in Figure 11 for holding the pawl 75 out of engagement with the teeth on the flange 77.

The parts are also so arranged that upon the completion of each stroke or full swing of the discharge tubes, the lug 92 engages the crank arm 83 for imparting limited rotation to the shaft 82 for thereby swinging the crank arm 84 clear of the arm 85 on the pawl 75, thereupon the spring 87 will move the pawl into engagement with the teeth on the flange 77. The flange 77 and the sprocket 76 are constantly rotated, and when such engagement occurs, the casing 74 will be rotated a full revolution for thereby rotating the shaft 74 and the cam 73. The cam 73 is so shaped, as shown in Figure 7, as to impart a quick movement in one direction to the bars 69 for sliding the frame 11 a short distance laterally in the machine. Then before the shaft 72 has completed one revolution, the lug 92 will have cleared the crank arm 83, whereupon the spring 93 will rotate the shaft 82 until the crank arm 84 again stands in the path of movement of the arm 85.

At the completion of one revolution of the shaft 72, the arm 85 will engage the arm 84 and the pawl 75 will be thrown out of operative position until the lug 94 again engages the arm 83.

It will thus be seen that in the practical operation of my improved machine, which has already been partially described, the radiator 93 is placed on the platform 11 and the platform 11 is moved to its farthermost position at one side of the machine.

When the motor is operated the pump will be operated for forcing solder through the pipe 18 and to the discharge pipe 21.

The parts are so arranged that the first stroke or swinging movement of the acid discharge pipe 32 discharges acid along one row of radiator tubes 94. At the completion of such stroke, the platform is moved laterally in the manner hereinbefore described, for bringing the second row of tubes beneath the discharge tube 32.

After another swinging movement of said discharge tube 32, the platform is again moved laterally by the action of the cam 73 and the mechanism connected therewith, and upon the third swinging movement of the discharge tubes, the solder discharged from the tube 21 will drop downwardly over the first row of radiator tubes 94. The operation is then continued until all the different radiator tubes have been subjected first to the cleaning by the acid, and second to the action of the melted solder.

The stroke of the discharge tubes can be regulated as desired by adjusting the shaft 57 in the slot 55, so that if only the upper parts of the radiator tubes are defective they only may be soldered.

It will be seen that after the machine has been started the entire radiator may be repaired without further attention to the machine.

With a machine of this kind the discharge of the melted solder is much more uniform and regular than where the solder is poured by hand, and I have found that a better job can be secured with my machine than can be done by hand.

Some changes may be made in the construction and arrangement of the parts of my improved machine without departing from the essential features and purposes of my invention, and it is my intention to cover by my claims any modified forms of structure or use of mechanical equivalents which may be reasonably included within the scope of my claims.

I claim as my invention:

1. In a radiator repair machine; a movable frame; means for imparting intermittent advancing movement to said frame; a solder discharge tube; and means for moving the discharge end of said tube across said frame with a reciprocating movement.

2. In a radiator repair machine; a movable frame; means for imparting intermittent advancing movement to said frame; a solder discharge tube; means for moving the discharge end of said tube across said frame with a reciprocating movement; a cleaner fluid discharge tube; and means for moving said last tube transversely across said frame, for subjecting the radiator thereon to the action of the fluid discharged from said second discharge tube before the radiator is subjected to the action of the solder from the first tube.

3. In a radiator repair machine; a movable frame; means for imparting intermittent advancing movement to said frame; a solder discharge tube; means for moving the discharge end of said tube across said frame with a reciprocating movement; and means for discharging melted solder over a portion of a radiator supported on said frame between each successive movements of the frame.

4. In a radiator repair machine, a solder discharge tube; and a cleaning fluid discharge tube mounted for similar swinging movement; and means for intermittently moving a radiator beneath said discharge tubes for successively bringing the tubes of the radiator first below said second described tube, and then below said first described tube.

5. In a radiator repair machine; a movable frame; means for imparting intermittent advancing movement to said frame; a solder discharge tube; means for moving the discharge end of said tube across said frame with a reciprocating movement; said last means being adjustable for regulating the movement of said discharge tube.

6. In a radiator repair machine; a movable frame; means for imparting intermittent advancing movement to said frame; a solder discharge tube; means for moving the discharge end of said tube across said frame in a direction across the path of travel of the frame with a reciprocating movement.

7. In a radiator repair machine; a movable frame for supporting a radiator; means for imparting intermittent advancing movement to said frame; and means for discharging melted solder over successive portions of a radiator resting on said frame between the successive movements of the radiator.

8. In a radiator repair machine; a frame; a slidable radiator supporting frame mounted thereon; a tank for solder; means for heating said solder; means for discharging solder from the tank upon a radiator supported on said second frame; said means including a pipe leading from said tank; a pump for drawing solder through said pipe; and a movable discharge tube connected with said pipe.

9. In a radiator repair machine; a frame; a slidable radiator supporting frame mounted thereon; a tank for solder; means for heating said solder; means for discharging solder from the tank upon a radiator supported on said second frame; said means comprising a pipe leading from said tank; a pump for forcing solder through said pipe; and means for heating said pipe.

10. In a machine of the class described, the combination of a melting bowl for containing solder, means for applying heat to it, a pump located in the melting bowl, a pipe communicating with the pump and extending upwardly therefrom, means for supporting a radiator adjacent to the discharge end of the pump, means for conveying the solder that passes through the radiator, back into the melting bowl, and a heater applied to said discharge pipe for maintaining the solder in molten condition while passing through the pipe.

11. In a radiator repair machine; a frame; a movable radiator supporting frame mounted thereon; a tank; a pipe leading from said tank; a swinging discharge pipe connected with said first pipe; a power shaft; and means for imparting reciprocatory swinging movement to said discharge pipe from said shaft.

12. In a radiator repair machine; a frame; a movable radiator supporting frame mounted thereon; a tank; a pipe leading from said tank; a swinging discharge pipe connected with said first pipe; a power shaft; means for imparting reciprocatory swinging movement to said discharge pipe from said shaft; said means being adjustable for regulating the swing of said discharge pipe.

13. In a radiator repair machine; a frame; a movable radiator supporting frame mounted thereon; a tank; a pipe leading from said tank; a swinging discharge pipe connected with said first pipe; a power shaft; means for imparting reciprocatory swinging movement to said discharge pipe from said shaft; and means operated from said shaft for imparting intermittent sliding movement to said radiator supporting frame.

14. In a radiator repair machine; a frame; a movable radiator supporting frame mounted thereon; a tank; a pipe leading from said tank; a swinging discharge pipe connected with said first pipe; a power shaft; means for imparting reciprocatory swinging movement to said discharge pipe from said shaft; means operated from said shaft for imparting intermittent sliding movement to said radiator supporting frame; the parts being so timed that the swinging movement of the discharge pipe occurs between the movements of the radiator supporting frame.

15. In a radiator repair machine; a frame; a movable radiator supporting frame mounted thereon; a tank; a pipe leading from said tank upwardly; a horizontal extension on said pipe; a swinging discharge pipe connected with said horizontal extension; means for imparting movement to said discharge pipe; means for imparting intermittent movement to said radiator supporting frame; a pump for forcing solder through said pipe; a drum surrounding said pipe; a heating means in said drum; and a heating means for said horizontal extension.

16. In a radiator repair machine; a frame; a radiator supporting frame mounted thereon for sliding movement; a tank; a swinging discharge pipe above said radiator supporting frame; means for forcing solder from said tank through said discharge pipe; means for imparting swinging movement to said discharge pipe; and means for imparting intermittent movement to said radiator supporting frame.

Des Moines, Iowa, July 9, 1919.

CLYDE E. SCHULZ.